Oct. 23, 1962     W. E. ALTMANN     3,059,492
SHIFTING ARRANGEMENT FOR CHANGE-SPEED GEARS
Filed Dec. 16, 1958     3 Sheets-Sheet 1
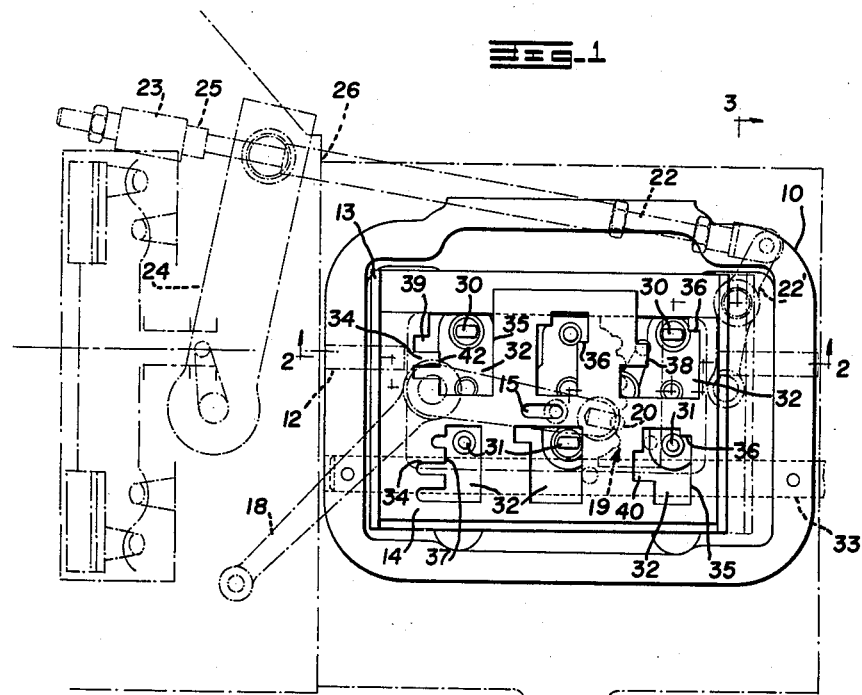
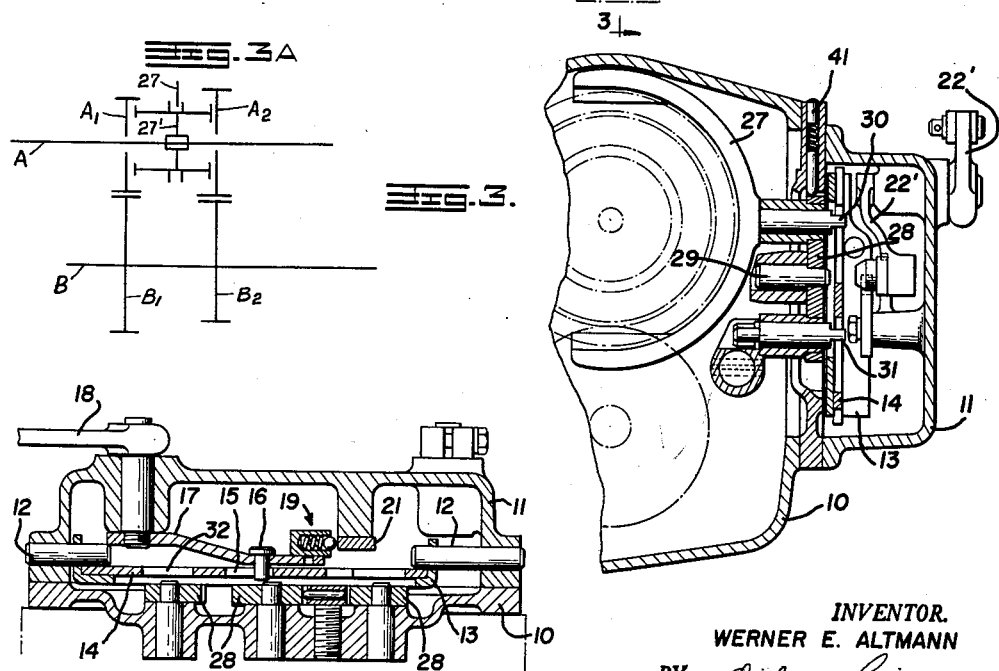
INVENTOR.
WERNER E. ALTMANN
BY *Dick and Craig*
ATTORNEYS

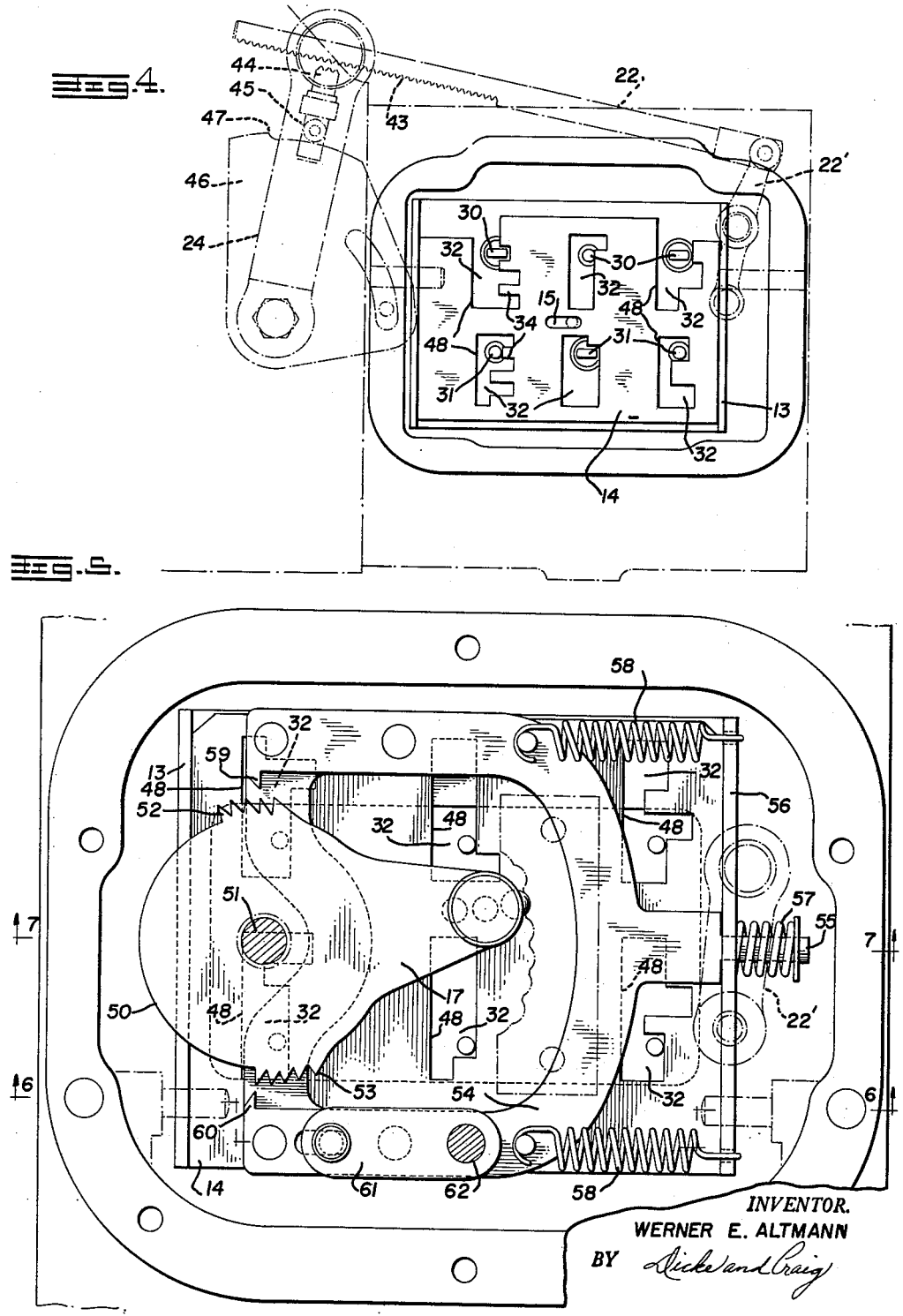

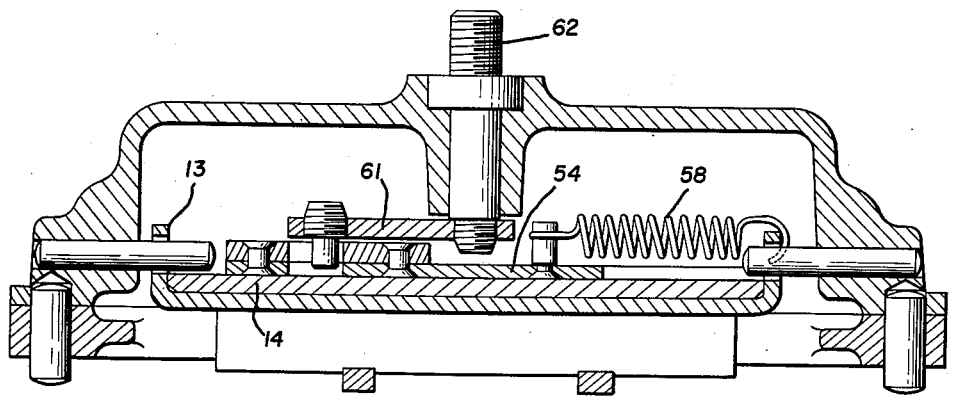
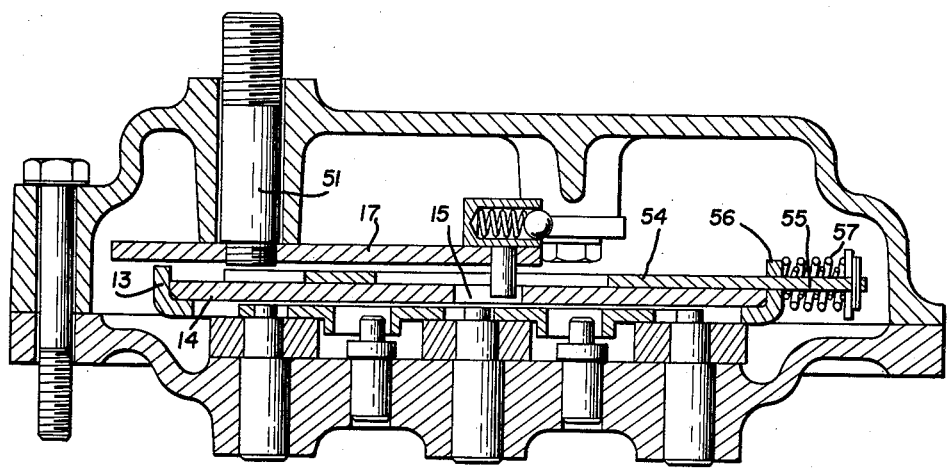
INVENTOR.
WERNER E. ALTMANN
BY *Dicke and Craig*
ATTORNEYS

United States Patent Office 3,059,492
Patented Oct. 23, 1962

3,059,492
SHIFTING ARRANGEMENT FOR
CHANGE-SPEED GEARS
Werner E. Altmann, Stuttgart, Germany, assignor to Daimler-Benz Aktiengesellschaft, Stuttgart-Unterturkheim, Germany
Filed Dec. 16, 1958, Ser. No. 780,811
Claims priority, application Germany Dec. 20, 1957
15 Claims. (Cl. 74—334)

The present invention relates to a shifting arrangement for motor-vehicle change-speed transmissions with actuation thereof by means of the main clutch, in which the normally freely rotatable gear wheels of the continuously meshing pairs of gear wheels are adapted to be selectively and operatively connected with the respective shafts thereof by means of axially displaceable clutch parts. Since such types of change-speed transmissions are well known in the prior art, a detailed description thereof is dispensed with herein especially as such description is believed unnecessary for a complete understanding of the present invention.

The present invention is concerned with providing, in such types of change-speed transmissions as mentioned hereinabove, the possibility of selective engagement of the respective transmission ratios or speed as desired by the driver.

According to the present invention, the problems underlying such an arrangement and the difficulties normally encountered therewith are solved in that the clutch parts or clutch elements of the gears are operatively connected within the transmission by corresponding appropriate intermediate link members, for example, by means of shifting forks, with a shifting plate arranged at the transmission housing and provided with channels, cut-out portions or recesses for the engagement of these intermediate link members, and in that this shifting plate is adapted to be selectively displaced or moved by means of a transmission shifting lever in a first displacement plane for purposes of preselecting the particular transmission ratios or speeds and is also adapted to be selectively moved or displaced in a second displacement plane by means of the disengaging lever of the main clutch or a corresponding linkage for purposes of the actual engagement of the respective speeds or transmission ratios. Appropriately, the second displacement plane, i.e., the second plane or direction in which the shifting plate has freedom of movement and which determines the actual engagement of the speeds, is arranged parallel to the transmission shafts whereas the first displacement plane or direction is arranged perpendicular thereto.

A construction in accordance with the present inventions offers the possibility of pre-selecting with the shifting lever any desired transmission ratio or speed. The shifting operation, properly speaking, that is, the engagement of the gear wheels, then takes place only by actuation of the main clutch so that no separate particular engaging force is required therefor at the shifting lever subsequent to the pre-selection nor for the synchronizing operation within the transmission.

According to one embodiment in accordance with the present invention, the shifting plate is so connected with the disengaging lever of the main clutch or with a corresponding member over a linkage effective as a lost-motion linkage that the shifting plate is taken along only during the last part of the movement of the disengaging lever of the clutch after the actuation of the main clutch has already taken place.

According to another embodiment in accordance with the present invention, the lost-motion linkage between the shifting plate and the disengaging lever of the main clutch may be so constructed that a rigid connection exists between the shifting plate and a movable element at the main clutch disengaging lever that is the same during the to and fro movement thereof.

According to the present invention, each intermediate link member, for example, each shifting fork is provided with a two-armed lever which is supported in the center thereof within the housing and which is rotatable or pivotal about the support axis thereof and is adapted to engage with a respective pin member at each end thereof in a corresponding cut-out portion of the shifting plate. The cut-out portions may thereby be so arranged, shaped and dimensioned that they offer, in the displacement plane or direction determining the engagement of the speeds, so much play beyond the stroke with respect to the pin members that the shifting plate, even with an engaged speed, is adapted to be moved freely in the displacement plant determining the selection or pre-selection of the next transmission ratio or speed.

According to a further embodiment in accordance with the present invention, a blocking of the shifting plate with an engaged speed takes place in such a manner that the cut-out portions offer no play over and above the stroke of the pin members.

In order to prevent destruction or damage to the transmission or other parts thereof in case a speed cannot be engaged by reason of blocking gear wheels, the present invention proposes the provision, in the connection between the shifting plate and the disengaging lever of the main clutch, a spring member adapted to be adjusted to a predetermined maximum safety value beyond which the spring member then permits a further movement of the disengaging lever.

The present invention is not limited in its application to motor vehicles but may be used and applied to constructions other than motor vehicles. However, the present invention is primarily of use with motor vehicles provided with so-called automatic clutches which are actuated by an auxiliary force, for example, by the vacuum in the suction line or intake manifold of the driving engine as is well known in the prior art.

Accordingly, it is an object of the present invention to provide a shifting arrangement for change-speed transmissions which enables a pre-selection of the particular speed to be engaged by means of a shifting lever or member and which automatically brings about engagement of the pre-selected speed automatically without the need of applying any additional force to the shifting member.

A further object of the present invention is the provision of a shifting arrangement for a change-speed transmission of a motor vehicle which is simple in the manipulation thereof, reliable in operation, inexpensive in construction, and which is particularly suitable for semi-automatic operation.

Still another object of the present invention is the provision of a shifting arrangement in accordance with the present invention for use with change-speed transmissions of motor vehicles having automatically actuated clutches in which the transmission ratio or speed is pre-selected by means of a shifting lever and in which the speed is thereupon automatically engaged by the automatic or semi-automatic or manual actuating device for the main clutch.

Still another object of the present invention is the provision of a shifting arrangement for motor vehicles provided with automatically operated clutches in which the engagement of the particular speed, after preselection thereof, is only engaged toward the end of the actuating movement of the main clutch.

A further object of the present invention resides in the provision of a safety device to prevent damage to the change-speed transmission or parts thereof in case of impossibility of engaging the particular preselected speed upon actuation of the clutch.

Still another object of the present invention is the provision of a shifting arrangement for change-speed transmissions in which the preselection of the particular speed to be engaged is made possible with a minimum effort and in which the engagement of the particular speed is assured by actuation of a device at the same time operating another part of the vehicle.

These and other objects, features and advantages of the present invention will become more obvious from the following description, when taken in connection with the accompanying drawing which shows, for purposes of illustration only, several embodiments in accordance with the present invention, and wherein:

FIGURE 1 is a side view of a shifting arrangement for a change-speed transmission construction in accordance with the present invention;

FIGURE 2 is a cross-sectional view taken along line 2—2 of FIGURE 1;

FIGURE 3 is a cross-sectional view taken along line 3—3 of FIGURE 1;

FIGURE 3A is a schematic illustration of a portion of a change-speed transmission controllable in accordance with applicant's invention.

FIGURE 4 is a side view of a modified embodiment of a shifting arrangement for a change-speed transmission in accordance with the present invention;

FIGURE 5 is a side view of still another embodiment of a shifting arrangement for a change-speed transmission in accordance with the present invention;

FIGURE 6 is a cross-sectional view taken along line 6—6 of FIGURE 5; and

FIGURE 7 is a cross-section view taken along line 7—7 of FIGURE 5.

Referring now to the drawing, wherein like reference numerals are used throughout the various views to designate like parts, and more particularly to FIGURES 1 to 3, reference numeral 10 designates therein the transmission casing to which a cover or lid 11 (FIGURES 2 and 3) is secured in any suitable manner, this cover or lid 11 not being shown in FIGURE 1. A trough-shaped member 13 is supported in the cover 11 on pin members 12. The trough-shaped member 13 is adapted to be moved or displaced on the pin members 12 in the longitudinal direction thereof, i.e., in the direction of the transmission shafts not shown herein.

A shifting plate 14 is supported in trough-shaped member 13 so as to be moved or displaced in a transverse direction, i.e., perpendicularly to the direction of movement of the trough-shaped member 13. The shifting plate 14 partakes in the movement of the trough-shaped member 13, and, therefore, is adapted to be moved in two planes of displacement independent of one another.

One of the displacements or movements, and more particularly the one in the transverse direction, serves for purposes of selection or preselection of the particular transmission ratio or speed. For this transverse movement, the shifting plate is provided in the center thereof with an elongated aperture 15 (FIGURES 1 and 2) into which engages a pivotal, swinging member or lever 17 by means of a pin member 16. The pivotal swinging member 17 is rotatably supported in the cover 11 of the transmission housing 10 in any suitable manner and is operatively connected over any appropriate intermediate link member 18 or any other suitable intermediate linkage with the shifting lever (not shown). A detent mechanism generally designated by reference numeral 19 (FIGURES 1 and 2) and of any suitable construction, for example, provided with a ball detent member or the like, is arranged at the end of the pivot lever 17, the ball member or the like of which engages in corresponding detents or recesses 20 provided in the transmission cover 11 (FIGURE 1) or in a separate detent disk 21 (FIGURE 2) provided therefor and thereby achieves a locking of the shifting plate 14 in the particular positions corresponding to the individual respective speeds of the transmission.

For purposes of movement in unison in the other displacement plane or direction, the trough-shaped member 13 and/or the shifting plate 14 are operatively connected over a lost-motion-like linkage, for example, in the form of a pull rod 22 and an intermediate lever 22' (FIGURES 1 and 3) with the disengaging lever 24 or a corresponding member of the main clutch shown in FIGURE 1. For purposes of entrainment during the last part of the stroke of the rod 22, the latter is provided with an adjustable abutment 25 (FIGURE 1) which is combined with a spring member 23 of suitable construction and adjustable to a predetermined maximum value which thereby permits further movement of the disengaging lever 24 also in case the transmission gears are blocked. During disengagement of the main clutch, which may take place either manually or by an auxiliary force, the disengaging lever 24 is rotated in the counterclock direction and during the last part of the movement thereof takes along over abutment 25 the pull rod 22 and therewith the trough-shaped member 13 and the shifting plate 14 for purposes of actual engagement of the particular preselected speed. During the return movement of the disengaging lever 24, i.e., during rotation thereof in a clockwise direction, the trough-shaped member 13 and the shifting plate 14 are again returned during the last part of the shifting movement to the neutral position thereof by means of the abutment at the spacing sleeve or bushing 26.

The invention is applicable to any type of transmission but has been illustrated herein in connection with a four-speed gear group transmission having two selectively engageable shifting clutches to selectively engage the freely rotatable gears of the transmission, a portion of the transmission gears being generally indicated in FIGURE 3 by dot-and-dash lines. FIGURE 3A is a schematic illustration of part of such a transmission, indicating as it does, two speed ratios between the shafts A and B shown, the arrangement of the complete four-speed and reverse transmission described in detail hereinafter being obvious from the showing of this figure. The arrangement illustrated includes continuously meshing pairs of gears A1, B1 and A2, B2, the gears A1 and A2 being freely rotatable on a shaft A which may be an input shaft to the transmission and the gears B1 and B2 being fixed to shaft B of the transmission which may be, for example, a counter shaft. The gears A1 and A2 may be selectively connected to the corresponding shaft A by axial displacement of a clutch means 27' keyed for rotation by the shaft A but axially movable thereon, this axially movable clutch means being movable by the shaft fork 27 shown in FIGURE 3. The selectively engageable shifting clutches may be constructed thereby in any other known manner. The shifting clutches are actuated by means of shifting forks 27 of which one is shown in FIGURE 3, which are supported by the intermediate members 28. The intermediate members 28 (FIGURES 2 and 3) are constructed as two-armed lever members and are rotatably supported in the center thereof on pin members 29 (FIGURE 3) within the housing 10 of of the transmission. The pin members 30 and 31 are arranged at the ends of the levers 28 which pin members 30 and 31 may be formed integrally with the shifting forks 27 themselves or may be inserted therein as separate elements.

The levers 28 engage with respective pins 30 and 31 thereof in a respective cut-out portion 32 provided in the shifting plate 14. Two cut-out portions each belong or are coordinated to each shifting clutch and, more particularly, the two outer pairs of cut-out portions 32 to the shifting clutches of the forward speeds whereas the center cut-out portions 32 serve for purposes of engagement of the reverse speed by means of a separate rod or link 33 (FIGURE 1).

The cut-out portions 32 are so dimensioned in relation to the movement and stroke of the shifting plate 14 that even with an engaged speed a movement transversely to the movement of trough-shaped member in the part of shifting plate 14, i.e., a new selection or preselection of another speed, is possible. The cut-out portions 32 are provided along the edges thereof effective during disengagement of the clutch with claw-like or prong-like contours which correspond to the particular speed. The oppositely arranged edges 35 are constructed to be smooth or straight and are provided only with locking notches 36 which are to prevent an accidental, unintentional engagement of the reverse speed.

Operation

The operation of the shifting arrangement of FIGURES 1–3 in accordance with the present invention is as follows:

The position of the various parts shown in FIGURES 1 to 3 of the drawing corresponds to the neutral or idling position of the transmission. The shifting plate 14 is now moved by means of the shifting lever (not shown), into a position corresponding to preselected, desired speed, for example, into the position thereof corresponding to first speed. During such actuation by counterclockwise rotation of lever 18, the shifting plate 14 thereby moves so far in the upward direction, as viewed in FIGURE 1, that the nose portion 37 provided in the lower left cut-out portion 32 of the left shifting clutch 27 will come to lie at about the same height as the pin member 31 thereof. With the right shifting clutch 27, the nose portion 38 provided in the upper right cut-out portion 32 now comes to lie in front of the pin 30 thereof.

If the clutch actuation now takes place, then the shifting plate 14 together with trough-shaped guide member 13 is moved toward the right while the main clutch is disengaged upon counterclockwise rotation of disengaging lever 24 beyond the point of abutment thereof with stop member 25 and therewith the pin member 31 of the left shifting clutch 27 and the pin member 30 of the right shifting clutch are taken along in a direction toward the right as viewed in FIGURE 1. As a result thereof, the two-armed lever 28 of the left shifting clutch 27 rotates in a counter-clockwise direction and the two-armed lever 28 of the right shifting clutch 27 in the clockwise direction whereby the corresponding other pin members 30 and 31 of the left and right shifting clutches respectively are adapted to engage in the channels or recesses 39 and 40 provided in the left and right cut-out portions 32 respectively. The shifting clutches 27 are correspondingly engaged and first speed is established. A detent mechanism 41 (FIGURE 3) of conventional construction thereby assures that the two-armed levers 28 are retained in the respective corresponding position thereof. Upon engagement of the main clutch by clockwise rotation of disengaging lever 24, the trough-shaped member 13 and the shifting plate 14 are taken back into the neutral position thereof upon abutment of disengaging lever 24 with stop member 26.

The second speed is again pre-selected by means of the shifting lever (not shown) whereby the shifting plate 14 is further displaced in the upward direction thereof up to the next notch of the detent mechanism 19. As a result of such further upward movement of shifting plate 14, the nose portion 42 at the upper left cut-out portion 32 of the left shifting clutch 27 is now disposed in front of the pin member 30 whereas in the right shifting clutch 27 the relatively wider nose portion 38 provided in the upper right cut-out portion 32 remains in front of the pin member 30 thereof. Upon disengagement of the main clutch by counterclockwise rotation of disengaging lever 24, only the first shifting clutch is actuated and as a result thereof instead of the first, the second gear pair is engaged.

A similar shifting operation takes place for all of the other speeds including engagement of the reverse speed by means of rod 33.

In the embodiment described hereinabove in connection with FIGURES 1–3, the engagement of the different speeds always takes place during the disengaging movement or stroke of the main clutch, i.e., by the counterclockwise rotation of disengaging lever 24 and, more particularly, by the construction of a lost-motion-like connection between the shifting plate 14 and the disengaging lever 24 only after actuation of the main clutch.

If, for example, the transmission is a four-speed countershaft transmission and consists of three pairs of gear wheels for the forward speeds, then a shifting clutch is operatively disposed and arranged between two pairs of gear wheels each. The arrangement may be made thereby in such a manner that the left shifting clutch, as viewed in FIGURE 1, is coordinated to the left or first pair of gear wheels, whereas the right shifting clutch of FIGURE 1 is coordinated to the third or right pair of gear wheels. The intermediate or second pair of gear wheels is then adapted to be operatively connected by the left as well as the right shifting clutch. The actuation of each shifting clutch takes place by means of a two-armed lever 28 as described hereinabove.

In the first speed, the left shifting clutch of FIGURE 1 is displaced toward the left and the right shifting clutch toward the right, i.e., the first and third pair of gear wheels are effective. Consequently, for purposes of engagement of the first speed, the two-armed lever 28 of the left shifting clutch is rotated in the counterclockwise direction, as described hereinabove, whereas the two-armed lever of the right shifting clutch is rotated in the clockwise direction for purposes of engaging the first speed.

In the second speed, the left shifting clutch is moved toward the right whereas the right shifting clutch remains in the right position thereof, i.e., the second and third pairs of gear wheels are operative. During shifting from first to second speed, only the left shifting clutch is actuated and more particularly, the two-armed lever 28 thereof is rotated in the clockwise direction as described hereinabove.

In the third speed, the left shifting clutch is moved toward the left and the right shifting clutch is also positioned to the left, i.e., the first and second pairs of gear wheels are operative. During shifting from second to third speed, both shifting clutches are actuated, and more particularly, both are moved from the right to the left as viewed in FIGURE 1 by appropriate rotation of the two-armed levers 28 thereof in the counterclockwise direction.

In the fourth speed, the left shifting clutch is positioned toward the right whereas the right shifting clutch as viewed in FIGURE 1 remains in the left position thereof. During changing from third to fourth speed, again only the left shifting clutch is shifted from the left towards the right. As a result thereof, the input shaft and output shaft are directly connected at the freely rotatable gear wheel of the second pair of gear wheels to provide a direct one-to-one transmission.

Thus, each two-armed lever 28 of each shifting clutch may be rotated in the clockwise and counterclockwise directions. The clockwise rotation causes an engagement of the pair of gear wheels disposed toward the right of the respective shifting clutch whereas the counterclockwise direction effects the engagement of the pair of gear wheels disposed to the left thereof.

For purposes of the reverse speed, a separate pair of gear wheels with a reversing gear, as is well-known in connection with countershaft transmissions, is provided in addition to the three pairs of gear wheels mentioned hereinabove. The additional transmission ratio of the reverse speed is actuated by means of rod 33. In effect, during engagement of the reverse speed, the rod 33 is displaced toward the left by the central two-armed lever 28. Simultaneously therewith, the left shifting clutch is rotated in the reverse speed in the counterclockwise direction so that the first pair of gear wheels becomes effective.

The foregoing description illustrates the application of the present invention to a four-speed, change-speed transmission having a reverse speed. However, it is understood that the present invention is not limited to this particular construction but may be modified and changed so as to be usable with any other change-speed gear of known construction.

In the embodiment according to FIGURE 4, the connection between the shifting plate 14 and the disengaging lever 24 of the main clutch is made in such a manner that during the to and fro movement over the same distance of movement thereof a rigid connection is established between both. For that purpose, the rod 22 is provided with a toothed rack 43 and a corresponding toothed segment 44 is arranged at the disengaging lever 24. The toothed segment 44 is displaceable or movable in the direction of the longitudinal axis of the disengaging lever 24 by means of a roller 45 which rolls off along a cam disk 46. The cam disk 46 itself is rigidly mounted at the transmission housing 10 or is suitably secured at any other suitable part during normal operation of the shifting arrangement but is adjustable in the rest position thereof with respect to the disengaging lever 24.

Operation

The operation of the embodiment according to FIGURE 4 is similar to that of FIGURE 3. Upon disengagement of the main clutch, the disengaging lever 24 rotates counterclockwise so that the roller 45 rolls off, during the last part of the movement or stroke thereof, along the raised cam portion 47 and therewith brings into engagement the toothed segment 44 with the tooth rack 43. As a result thereof, the disengaging lever 24 is effectively rigidly or positively connected with the shifting plate 14 for movement in unison. This positive connection remains effective for such length of time until, during re-engagement of the main clutch by clockwise rotation of disengaging lever 24, the roller 45 again slides off the raised cam portion 47. Only then the positive connection between both parts 24 and 14 is again disengaged.

The cut-out portions 32 in the shifting plate 14 are thereby so constructed in the case of the embodiment of FIGURE 4 that with an engaged speed the shifting plate 14 is blocked with respect to a movement by means of the shifting lever (not shown). The claw-like or prong-like edges 34 are thereby provided on the opposite sides of the cut-out portions 32. Upon disengagement of the main clutch, i.e., with the movement of the shifting plate 14 toward the right, as viewed in FIGURE 4, all the shift-clutches 27 (not shown) in the transmission are returned by the straight edge portions 48 to the central neutral positions thereof. Only now the preselection of the speed can take place in the manner described hereinabove by means of the shifting lever (not shown). Upon engagement of the main clutch, i.e., upon clockwise rotation of disengaging lever 24, the desired preselected speed is engaged during the first part of the main-clutch engaging movement thereof, then the rigid connection between the disengaging lever 24 and the shifting plate 14 is disengaged, and only upon further movement of the disengaging lever 24 the main clutch is thereupon re-engaged.

FIGURES 5 through 7 illustrate a modified embodiment of a transmission shifting arrangement in according with the present invention provided with a longitudinally movable trough-shaped member 13 and a shifting plate 14 movable transversely or perpendicularly thereto.

Cut-out portions 32 are again provided in the shifting plate 14 of this embodiment, the edges of which serve for purposes of actuating the shifting forks over intermediate members 28 as described hereinabove in connection with FIGURES 1–4. The trough-shaped guide member 13 is thereby again operatively connected for actuation thereof by the intermediate lever 22′ with a disengaging lever (not shown herein) of the main clutch or with a corresponding member. The pivotal swinging member or lever 17 (FIGURES 5 and 7) again engages in an elongated aperture 15 (FIGURE 7) of the shifting plate 14 and is operative to displace the same for purposes of preselection in the transverse direction, i.e., in the upward and downward direction as viewed in FIGURE 5. The swinging lever 17 is provided with a disk-shaped portion 50 (FIGURE 5) and is secured to a shaft 51 which is operatively connected, in any suitable manner, so as to rotate in unison with the shifting lever (not shown).

Two oppositely disposed series or rows of detent teeth 52 and 53 are provided along the disk-shaped part 50. Each of the toothed detent rows 52 and 53 has a number of teeth corresponding to the number of speeds adapted to be selected in the particular transmission with which the shifting arrangement is to be used. One of the detent rows, for example, the detent row 52 serves for shifting up, i.e., for shifting to higher speeds, and the other, for example, the detent row 53, for shifting down, i.e., for shifting to lower speeds. An escape-like actuating member operative to provide a step-by-step movement which is constructed in the form of a two-armed fork-shaped lever 54 is provided for purposes of engagement with these detent rows 52 and 53. The fork-shaped lever 54 thereby extends with the stem-like or extended portion 55 thereof through the bent-up part 56 (FIGURES 5 and 7) of the trough-shaped member 13. The stem-like portion 55 or extension is adapted to be movable in the longitudinal direction with respect to the trough-shaped member 13 and is pre-tensioned by means of springs 57 (FIGURES 5 and 7) and 58 (FIGURES 5 and 6). The fork-shaped lever 54 surrounds with both ends thereof the disk-shaped part 50. Nose portions or projections 59 and 60 (FIGURE 5) are provided at the ends of the fork-shaped member 54 for purposes of engagement into the detent rows 52 and 53.

The escape-like fork-shaped lever 54 is shown, for purposes of clarity thereof, in a neutral position, i.e., without engaging with either of the detent rows 52 or 53. The escape-like fork-shaped lever 54 may be moved into one of the two effective positions thereof by means of a further pivot lever 61 (FIGURE 6). The pivot lever 61 is secured to a shaft 62 which is operatively connected in any suitable manner with an actuating member (not shown) for the preselection of the shifting direction. In one of the effective positions thereof, for example, for shifting up, the nose portion 59 engages the detent row 52. If, by actuation of the actuating member and therewith of the pivotal shifting lever 61, the escape-like fork-shaped lever 54 is brought into the other effective position thereof, then the nose portion 60 engages with the detent row 53, which will correspond, for example, to a shifting down. The respective other nose portion is then always out of engagement with the corresponding detent row so that at all times only one nose portion is in engagement with the teeth of a corresponding detent row. The arrangement is oftentimes made in practice in such a way that by means of a futher spring (not illustrated herein) which may be operatively connected, for example, with the actuating member, or also by the different selection of the spring stiffness of springs 58, the escape-like lever 54 is always in one position thereof effecting one predetermined shifting direction. If a shifting in the other direction is desired, then the shaft 62 of the pivot lever 61 has to be rotated in opposition to the spring force and therewith the escape-like lever 54 is pivoted into the other effective position thereof.

Operation

The operation of the device illustrated in FIGURES 5 through 7, if, as actuating member, the shifting lever itself (not shown) is provided, is as follows:

The escape-like fork-shaped lever 54 normally is in the position thereof determining shifting down, i.e., the nose portion 59 is in engagement with the toothed detent row 52 whereas the nose portion 60 is disengaged from the toothed row 53. Upon disengagement of the main clutch, the trough-shaped member 13 together with the shifting plate 14 is moved toward the right as viewed in FIGURE 5 by means of the swinging lever 22' and therewith all intermediate members 28 for the shifting clutches 27 are adjusted to the neutral or idling positions thereof by the edge portions 48 provided in cut-out portions 32. The escape-like fork-shaped lever 54 at first cannot follow this longitudinal movement since a transverse movement of the shifting plate 14, that would follow from a relative movement between lever 54 and disk-shaped portion 50 of lever 17 resulting in rotation of the latter, at first is still blocked by reason of the abutment of the projections in the cut-out portions 32 against the pin members of intermediate members 28. The escape-like fork-shaped lever 54, therefore, remains stationary under the spring force of springs 57 and 58 with respect to the trough-shaped member 13. Only after the pin members of the intermediate members 28 are displaced into the neutral position thereof, the transverse movement of the shifting plate 14 is released and the springs 57 and 58 again pull back the escape-like fork-shaped lever 54 until abutment against the trough-shaped member 13 is re-established. As a result thereof, the pivot lever 17 is rotated by one step, i.e., by one speed, in the shifting-up direction by means of nose portion 59. The shifting plate 14 now is in a position determining the next higher speed. Upon clutch engagement, the next higher speed is engaged in a manner described hereinabove by the corresponding rotation of the intermediate members 28 of shifting clutches 27 by means of corresponding appropriately-shaped claw-like edge portions of the cut-out portions 32.

For shifting down, during disengagement of the clutch, the shifting lever is pressed down and therewith the escape lever with the nose portion 60 is brought into engagement with the other toothed detent row 53 over the pivot lever 61. The further shifting operation takes place in the same manner as described hereinabove. Only the pivot lever 17 is rotated thereby in the other direction, i.e., in the direction toward a lower speed. The detents and nose portions are so constructed on the rear side thereof that a manual overriding shifting operation is possible without any difficulty.

From the foregoing description it is seen that the actuation of the shifting clutches of the transmission is carried out in accordance with the actuation of the main clutch, although in one embodiment the engagement of a pre-selected transmission speed is effected in accordance with disengagement of the main clutch whereas in another embodiment the pre-selected transmission speed is engaged in accordance with the actuation of the main clutch for re-engagement of the latter.

While I have shown and described several embodiments in accordance with the present invention, it is understood that the same is not limited thereto but is susceptible of many changes and modifications within the spirit and scope of the present invention and I, therefore, do not wish to be limited to the particular construction illustrated herein but intend to cover all such changes and modifications as encompassed by the scope of the appended claims.

I claim:

1. A shifting arrangement for a motor vehicle change-speed transmission adapted to be driven by the main clutch of the vehicle, said main clutch having a control lever, said change-speed transmission being of the type including continuously meshing pairs of gear means, each pair of gear means having a freely rotatable gear adapted to be connected with a respective shaft thereof, comprising clutch means for engaging a freely rotatable gear with the corresponding shaft thereof, said clutch means comprising for each speed oppositely movable clutch forks, means for controlling said clutch means comprising a shifting plate member and oppositely movable pivoted members, said members being operatively engageable by said plate member and connected to said clutch forks for moving said clutch forks in opposite directions, means containing said plate member comprising a trough-shaped member, means for selectively moving said shifting plate member relatively to said trough-shaped member in a first direction of movement to a position for preselecting the speed to be engaged, means including said control lever for moving said trough-shaped member and said shifting plate member in a second direction of movement from said position, said plate member when moved in said second direction being effective to move said oppositely movable pivoted members for moving two of said clutch forks in opposite directions.

2. A shifting arrangement according to claim 1, wherein said means for moving said trough-shaped member and said plate member further includes linkage means comprising an endwise-movable rod and lost motion connecting means between said rod and said control lever effective to cause movements of said trough-shaped member and said plate member only during the last parts of the oppositely directed rotative movements of said control lever.

3. A shifting arrangement according to claim 1, wherein said means including said control lever further includes a pull rod operatively connected to said trough-shaped member, toothed means on said rod, a movable toothed member on said control lever adapted for engagement with said toothed means, and cams means including a stationary cam member for moving said toothed member into locking engagement with said toothed means during the last part of a counterclockwise movement of said control lever.

4. A shifting arrangement according to claim 1, wherein said oppositely movable pivoted members are comprised by two-armed levers pivoted at their centers, said clutch forks having pin means engaging said levers.

5. A shifting arrangement according to claim 1, said plate member comprising cut-out portions, said clutch forks being provided with a plurality of pin means, said pin means being disposed at the ends of said oppositely movable pivoted members, said pin means engaging in said cut-out portions.

6. A shifting arrangement according to claim 5, wherein said cut-out portions have so much play with respect to said pin means in said second direction of movement that said shifting plate member even with an engaged speed is freely movable in said first direction.

7. A shifting arrangement according to claim 5, wherein said cut-out portions have no play with respect to said pin means in said second direction of movement so that said shifting plate member with an engaged speed is blocked against any movement in said first direction.

8. A shifting arrangement according to claim 5, wherein a plurality of said cut-out portions comprise edge portions free of recesses and extending transversely of said shifting plate, said plurality of said cut-out portions further comprising nose portions disposed opposite said edge portions, means including two of said edge portions forming notches effective to prevent unintentional engagement of reverse speed.

9. A shifting arrangement according to claim 1, wherein said movement of said trough-shaped member and said shifting plate by said last-named means in said second direction is dependent upon a movement of said control lever in a direction such as to disengage said main clutch.

10. A shifting arrangement according to claim 1, wherein said means for moving said trough-shaped member and said shifting plate member comprises resilient lost motion means engageable by said control lever and effective to permit lost motion thereof upon blocking of said gear means.

11. A shifting arrangement according to claim 1, wherein said means for moving said trough-shaped member and said shifting plate member includes a rod member, means pivotally connecting said trough-shaped member and said rod member, said rod member being provided with spaced abutment members between which said control lever is received, one of said abutment members being adjustable.

12. A switching arrangement according to claim 1, wherein said means including said control lever for moving said trough-shaped member and said shifting plate comprises a pull rod, pivotal means connecting said pull rod and said trough-shaped member, a toothed rack on said pull rod, a slidable member comprising a toothed segment being mounted on said control lever for movement in a direction longitudinal thereof, and cam means for moving said slidable member in said direction to cause engagement of said segment with said toothed rack during a portion of a counterclockwise movement of said control lever.

13. A shifting arrangement according to claim 12, wherein said cam means includes an adjustably positioned cam element and a roller element on said slidable member.

14. A shifting arrangement according to claim 1, wherein said means for selectively moving said shifting plate member comprises an adjustable lever member, a pin member on said lever member, an elongated aperture in said shifting plate member receiving said pin member, and yieldable detent means for releasably locking said lever member in adjusted positions thereof.

15. A shifting arrangement according to claim 1, said plate member comprising cut-out portions having nose portions and recesses, said clutch forks having a plurality of pins means connected to said pivoted members, two of said nose portions when said plate member is moved to said position being disposed adjacent two of said plurality of pin means.

References Cited in the file of this patent

UNITED STATES PATENTS

| | | |
|---|---|---|
| 2,174,259 | Feerick et al. | Sept. 26, 1939 |
| 2,186,536 | Maier | Jan. 9, 1940 |
| 2,230,847 | Pickett | Feb. 4, 1941 |
| 2,885,899 | Foster | May 12, 1959 |